(12) United States Patent
Kim et al.

(10) Patent No.: US 7,489,430 B2
(45) Date of Patent: Feb. 10, 2009

(54) POLYGONAL MIRROR APPARATUS

(75) Inventors: Hyun-surk Kim, Suwon-si (KR); Hyeong-chae Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 289 days.

(21) Appl. No.: 11/098,559

(22) Filed: Apr. 5, 2005

(65) Prior Publication Data
US 2005/0225820 A1 Oct. 13, 2005

(30) Foreign Application Priority Data
Apr. 7, 2004 (KR) ............... 10-2004-0023801

(51) Int. Cl.
*G02B 26/08* (2006.01)
(52) U.S. Cl. ............ 359/218; 359/198; 359/200
(58) Field of Classification Search ........... 359/200, 359/216
See application file for complete search history.

(56) References Cited

U.S. PATENT DOCUMENTS 5,596,443 A    1/1997   Konno

FOREIGN PATENT DOCUMENTS

| CN | 1211753 | 3/1999 |
|---|---|---|
| JP | 62-034120 | 2/1987 |
| JP | 05-011206 | 1/1993 |
| JP | 05-346552 | * 12/1993 |
| JP | 06-110002 | 4/1994 |
| JP | 07-098403 | 4/1995 |
| JP | 07-294838 | 11/1995 |
| JP | 09-113835 | 5/1997 |
| JP | 2000-292732 | 10/2000 |
| JP | 2001-083450 | 3/2001 |

* cited by examiner

*Primary Examiner*—James Phan
(74) *Attorney, Agent, or Firm*—Roylance, Abrams, Berdo & Goodman, L.L.P.

(57) ABSTRACT

A polygonal mirror apparatus with an improved installation structure of a polygonal mirror, which is made using a plastic material, with respect to a rotor frame. The polygonal mirror apparatus includes a base, and a bearing coupled to the base and having a first bore. A rotating shaft is rotatably installed in the first bore. A rotor frame rotates together with the rotating shaft. A polygonal mirror is secured to the rotating shaft and coupled to the rotor frame through insert molding. The polygonal mirror deflects and scans incident light. A driving source formed at the bearing and the rotor frame rotates the polygonal mirror using electromagnetic power.

19 Claims, 15 Drawing Sheets

POLYGONAL MIRROR APPARATUS

CROSS REFERENCE TO RELATED APPLICATIONS

This application claims the benefit under 35 U.S.C. § 119 (a) of Korean Patent Application No. 10-2004-0023801, filed on Apr. 7, 2004, in the Korean Intellectual Property Office, the entire disclosure of which is hereby incorporated by reference.

BACKGROUND OF THE INVENTION

1. Field of the Invention

The present invention relates to a polygonal mirror apparatus with a polygonal mirror made of a plastic material. More particularly, the present invention relates to a polygonal mirror apparatus with an improved installation structure of a polygonal mirror with respect to a rotor frame.

2. Description of the Related Art

Generally, a polygonal mirror apparatus is used in a laser scanning unit (LSU) employed in devices such as a laser printer, a digital copy machine, a barcode reader, and a facsimile machine, and that scans a beam emitted from a light source of the LSU in a main scan direction using a rotating polygonal mirror.

With the development of technology, a print speed of a device using an LSU has increased. Accordingly, a polygonal mirror apparatus is required to rotate a polygonal mirror at a high speed and to operate for a long period of time. In addition, the polygonal mirror is required to have a reflectance higher than 85% to increase efficiency of a scanning beam. To meet these requirements, a conventional polygonal mirror apparatus uses a polygonal mirror made by performing microprocessing of aluminum with a degree of purity of at least 99%.

Referring to FIG. 1, a conventional polygonal mirror apparatus includes a base 11, and a bearing 13 fixed at the base 11. A rotating shaft 15 is rotatably installed at the bearing 13. A rotor frame 17 is coupled to the rotating shaft 15, a driving source 20, and a polygonal mirror 30.

The driving source 20 is divided and installed at an outer circumference of the bearing 13 and at the rotating shaft 15 to rotate the rotating shaft 15 through electromagnetic power. The driving source 20 includes a stator core 21, a rotor housing 23, and a magnet 25. The stator core 21 is fixed at the outer circumference of the bearing 13 and includes a wound coil 22. The rotor housing 23 is coupled to the rotor frame 17 and surrounds the stator core 22.

The polygonal mirror 30 is rotated by the driving source 20, thereby deflecting and scanning a beam incident into a reflecting mirror 31 provided on a sidewall of the polygonal mirror 30. The polygonal mirror 30 is coupled to an outer circumference of the rotor frame 17 and is fixed thereto with a fixing member 35. The polygonal mirror 30 is made using an aluminum material with a high degree of purity and has a plurality of reflecting mirrors formed through micromachining of metals.

Since the polygonal mirror 30 of the conventional polygonal mirror apparatus having the above-described structure is made using expensive aluminum, the manufacturing cost is high. Moreover, since micromachining of metals is used to form the polygonal mirror 30, productivity is very low. In addition, since the polygonal mirror 30 is fixed to the rotor frame 17 with the fixing member 35, the assembly processes is complicated and the number of parts increases.

SUMMARY OF THE INVENTION

The present invention provides a polygonal mirror apparatus that increases assembly efficiency and productivity by changing a material of a polygonal mirror and a coupling structure between the polygonal mirror and a rotor frame.

According to an aspect of the present invention, there is provided a polygonal mirror apparatus including a base, and a bearing coupled to the base and having a first hollow. A rotating shaft is rotatably installed in the first hollow. A rotor frame rotates with the rotating shaft. A polygonal mirror is fixed at the rotating shaft and coupled to the rotor frame through insert molding. The polygonal mirror deflects and scans incident light. A driving source is formed at the bearing and the rotor frame to rotate the polygonal mirror using electromagnetic power.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and other features and advantages of the present invention will become more apparent by describing in detail preferred embodiments thereof with reference to the attached drawings, in which.

Throughout the drawings, like reference numerals will be understood to refer to like parts, components and structures.

DETAILED DESCRIPTION OF EXEMPLARY EMBODIMENTS

Figure 2A:
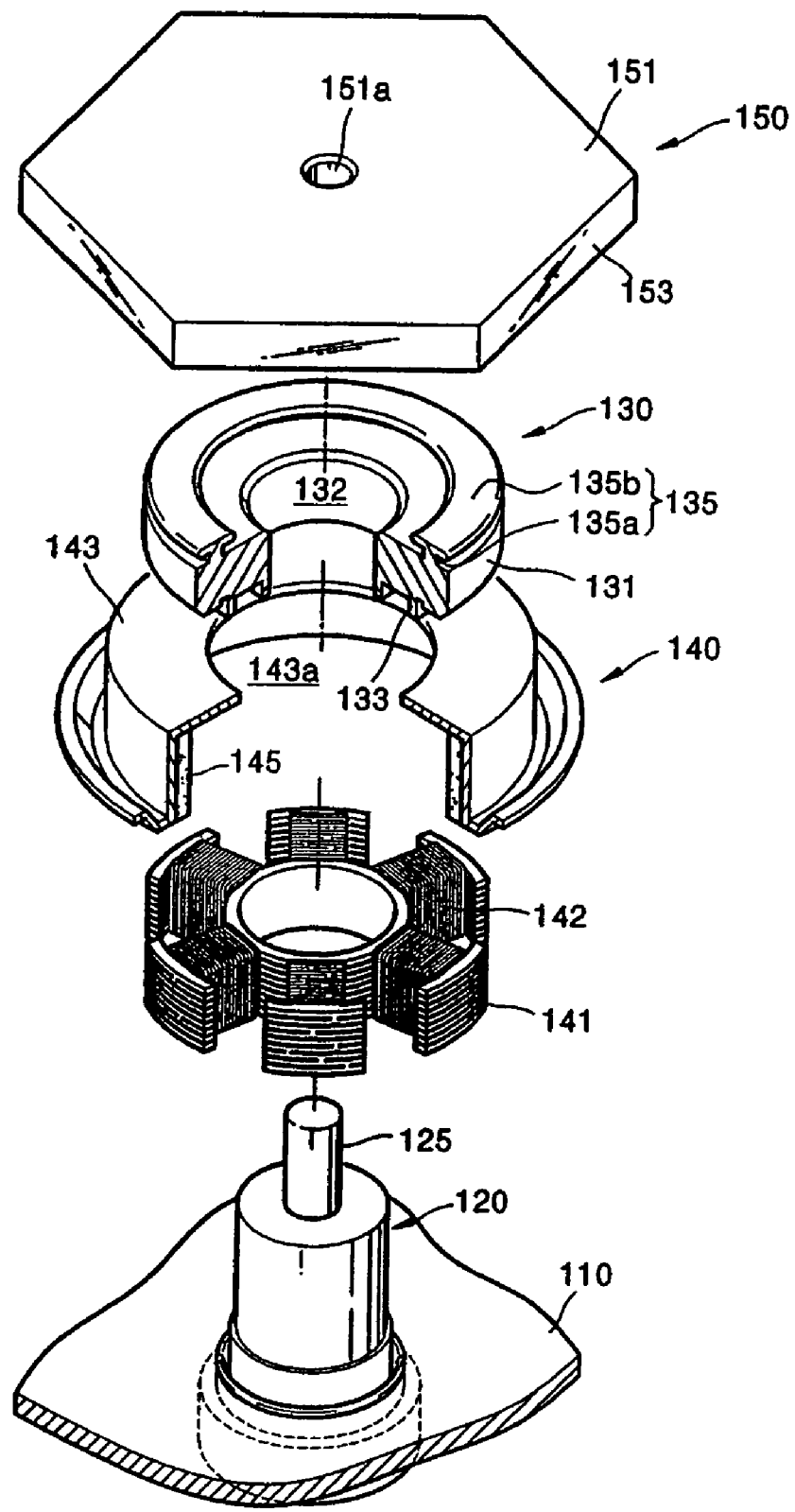
FIG. 2A is an exploded, partially cut-away perspective view of a polygonal mirror apparatus according to a first embodiment of the present invention.
Figure 2B:
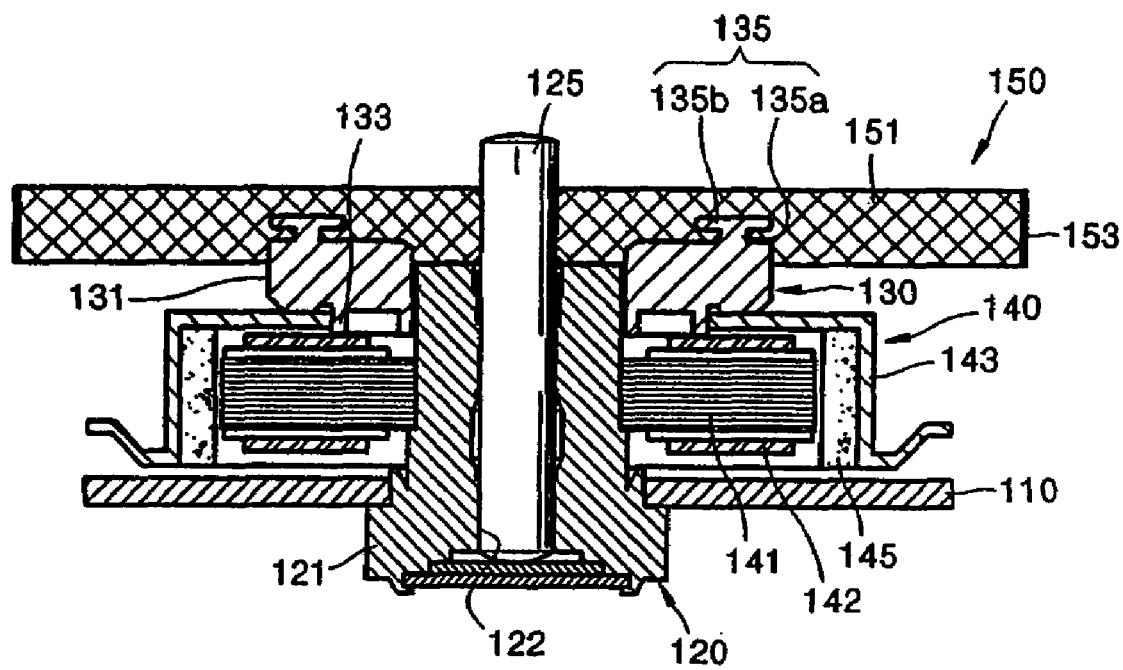
FIG. 2B is a sectional view of the polygonal mirror apparatus according to the first embodiment of the present invention.

Referring to FIGS. 2A and 2B, a polygonal mirror apparatus according to a first embodiment of the present invention includes a base 110, a bearing 120 fixed at the base 110, and a rotating shaft 125 rotatably installed at the bearing 120. A rotor frame 130 is indirectly installed at the rotating shaft 125. A driving source 140 rotates the rotating shaft 125. A polygonal mirror 150 is molded to be coupled to the rotor frame 130.

The bearing 120 includes a bearing housing 121 and a first bore 122 formed in the bearing housing 121. The bearing 120 supports the rotating shaft 125 inserted in the first bore 122 to be rotated by hydrodynamic pressure or aerodynamic pressure.

The driving source 140 is divided and installed at the bearing housing 121 and the rotating shaft 125 and rotates the rotating shaft 125 through electromagnetic power. The driving source 140 includes a stator core 141 fixed around an outer circumference of the bearing housing 121, a rotor housing 143, and a magnet 145. The stator core 141 includes a wound coil 142. The rotor housing 143 is coupled to the rotor frame 130 to surround the stator core 141. The magnet 145 is installed on an inside of the rotor housing 143 to face the stator core 141.

The rotor frame 130 connects the driving source 140 with the polygonal mirror 150. The rotor frame 130 is coupled to the driving source 140 in a typical coupling manner. For example, the rotor frame 130 may be pushed into an opening 143a formed in the rotor housing 143. However, the rotor frame 130 is coupled to the polygonal mirror 150 through insert molding. For this coupling, the rotor frame 130 includes a body 131 having a second bore 132 and an insert 135 protruding from the body 131.

A part of the body 131 is inserted in the polygonal mirror 150 and the rest of the body 131 is exposed outside thereof. A coupling projection 133 coupled to the rotor housing 143 is formed on a bottom of the exposed body 131. The body 131 preferably has a cylindrical shape with a predetermined thickness around the second bore 132.

The insert 135 includes a neck 135a and a head 135b. The neck 135a protrudes from a top of the body 131 and has a circular ring shape with a predetermined width. The head 135b is positioned on the neck 135a and has a circular ring shape with a greater width than the neck 135a. When the polygonal mirror 150 is molded with respect to the rotor frame 130 a part of the polygonal mirror 150 is positioned at the neck 135a, thereby substantially preventing the polygonal mirror 150 from being separated even during high-speed rotation.

Figure 1:
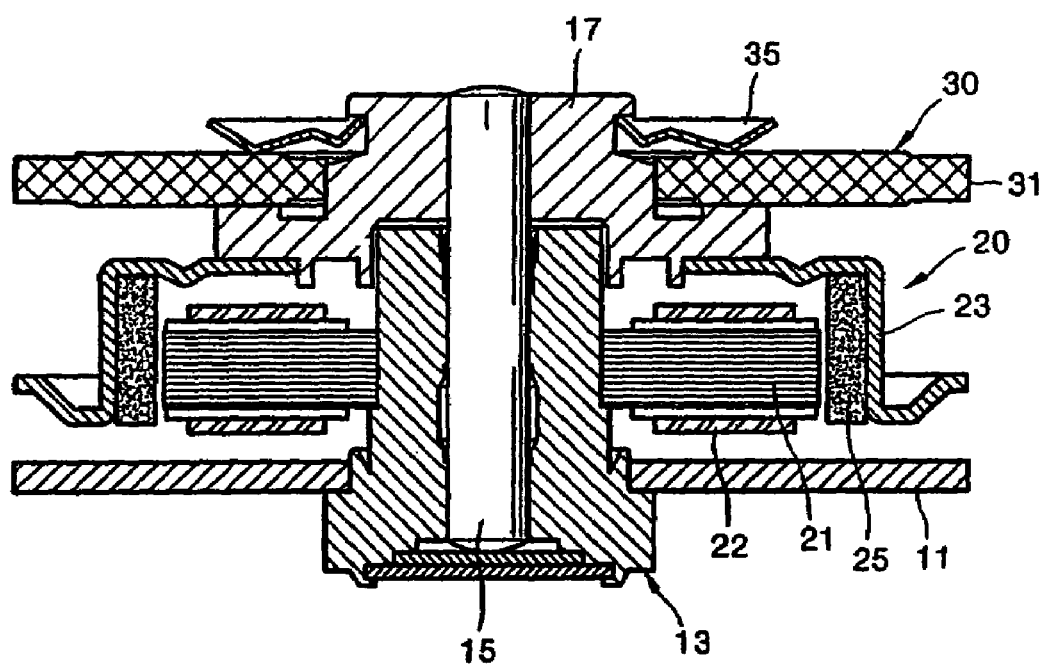
FIG. 1 is a schematic sectional view of a conventional polygonal mirror apparatus.

The polygonal mirror 150 is rotated around the rotating shaft 125 by the driving source 140, thereby deflecting and scanning a beam incident into a reflector 153 provided on a sidewall of the polygonal mirror 150. The polygonal mirror 150 is made mainly using a plastic material and is molded to be coupled with the rotor frame 130 through insert molding. Accordingly, the polygonal mirror 150 may be fixed to the rotor frame 130 without a fixing member (see 35 illustrated in FIG. 1).

The polygonal mirror 150 includes a polygonal mirror body 151 with a third bore 151a. A photocurable resin (not shown) preferably coats the sidewall of the polygonal mirror body 151. The reflector 153 is formed on the photocurable resin.

The third bore 151a has a diameter corresponding to a diameter of the rotating shaft 125. The rotating shaft 125 and the third bore 151a are coupled using push-fit installation to secure the polygonal mirror body 151 to the rotating shaft 125. The polygonal mirror 150 may be integrally formed using insert molding to be aligned with the rotating shaft 125.

The photocurable resin planarizes the polygonal mirror body 151 having deformation that occurs during molding of a plastic material. Since the photocurable resin planarizes the sidewall of the polygonal mirror 150, errors in the reflector 153 caused by a process error occurring during insert molding may be minimized. The reflector 153 is formed by coating the photocurable resin with a metal, such as aluminum (Al) or silver (Ag), having a high reflectance.

Alternatively, a ceramic layer instead of the photocurable resin may be formed on the polygonal mirror 150, and the reflector 153 may be formed on the ceramic layer. The ceramic layer enhances the strength of the sidewall of the polygonal mirror body 151. Increasing the strength of the polygonal mirror 150 allows the polygonal mirror 150 to bear up against a tensile load generated by a turning effect, even when the polygon mirror 150 rotates at high speed (above about 10,000 rpm).

As described above, when the rotor frame 130 has the above-described structure and disposition and the polygonal mirror 150 is made of a plastic material and is coupled to the rotor frame 130 using insert molding, a polygonal mirror apparatus is provided having performance equal to or higher than that of a conventional polygonal mirror apparatus and having a simplified structure. Accordingly, the number of assembly processes and manufacturing costs may be reduced.

Hereinafter, other exemplary embodiments of the present invention will be described with reference to FIGS. 3 through 15. In the second through fourteenth embodiments of the present invention described below, the structure and disposition of a base, a bearing, a rotating shaft, and a driving source are substantially similar to those of the base 10, the bearing 120, the rotating shaft 125, and the driving source 140 included in the polygonal mirror apparatus illustrated in FIGS. 2A and 2B according to the first embodiment of the present invention. Accordingly, like reference numerals refer to the like elements in the drawings, and thus a detailed description thereof is omitted.

Figure 3:
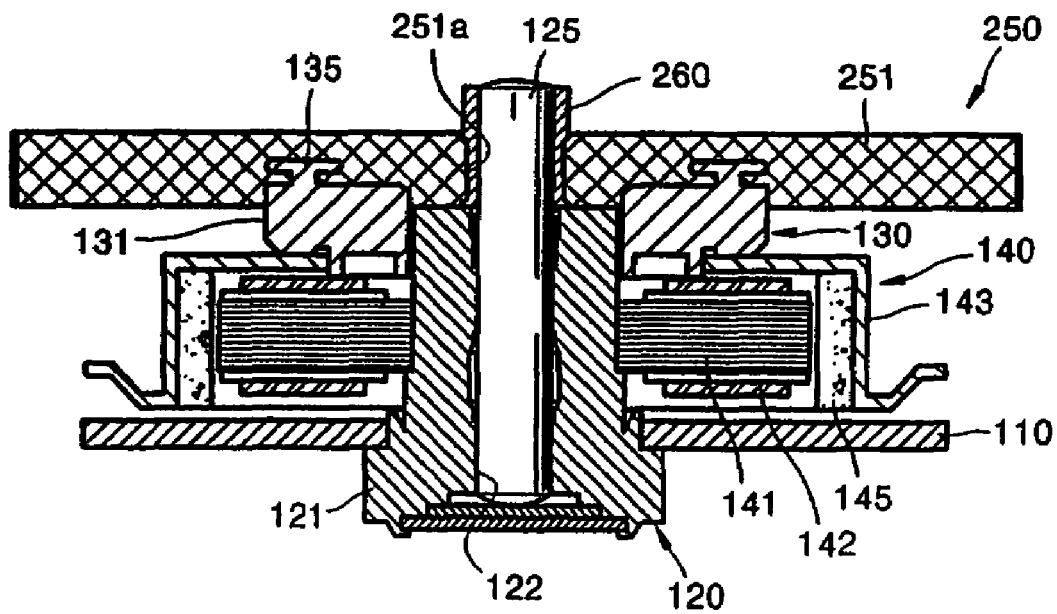
FIG. 3 is a sectional view of a polygonal mirror apparatus according to a second embodiment of the present invention.

Referring to FIG. 3, a polygonal mirror apparatus according to a second embodiment of the present invention is substantially similar to the first embodiment of the present invention, with the exception of a coupling structure disposed between a polygonal mirror 250 and the rotating shaft 125.

The polygonal mirror 250 includes a fourth bore 251a having a diameter greater than that of the rotating shaft 125. In addition, a shaft housing 260 is disposed between the fourth bore 251*a* and the rotating shaft 125. The shaft housing 260 is formed using a metal material and is inserted into the polygonal mirror 250 when the polygonal mirror 250 is formed using insert molding. The shaft housing 260 is substantially ring-shaped and is push fitted onto the rotating shaft 125, thereby fixing the polygonal mirror 250 to the rotating shaft 125. As described above, when the shaft housing 260 is additionally provided between the polygonal mirror 250 and the rotating shaft 125, the polygonal mirror 250 is substantially prevented from being separated from the rotating shaft 125 and cracking during high-speed rotation.

Figure 4A:
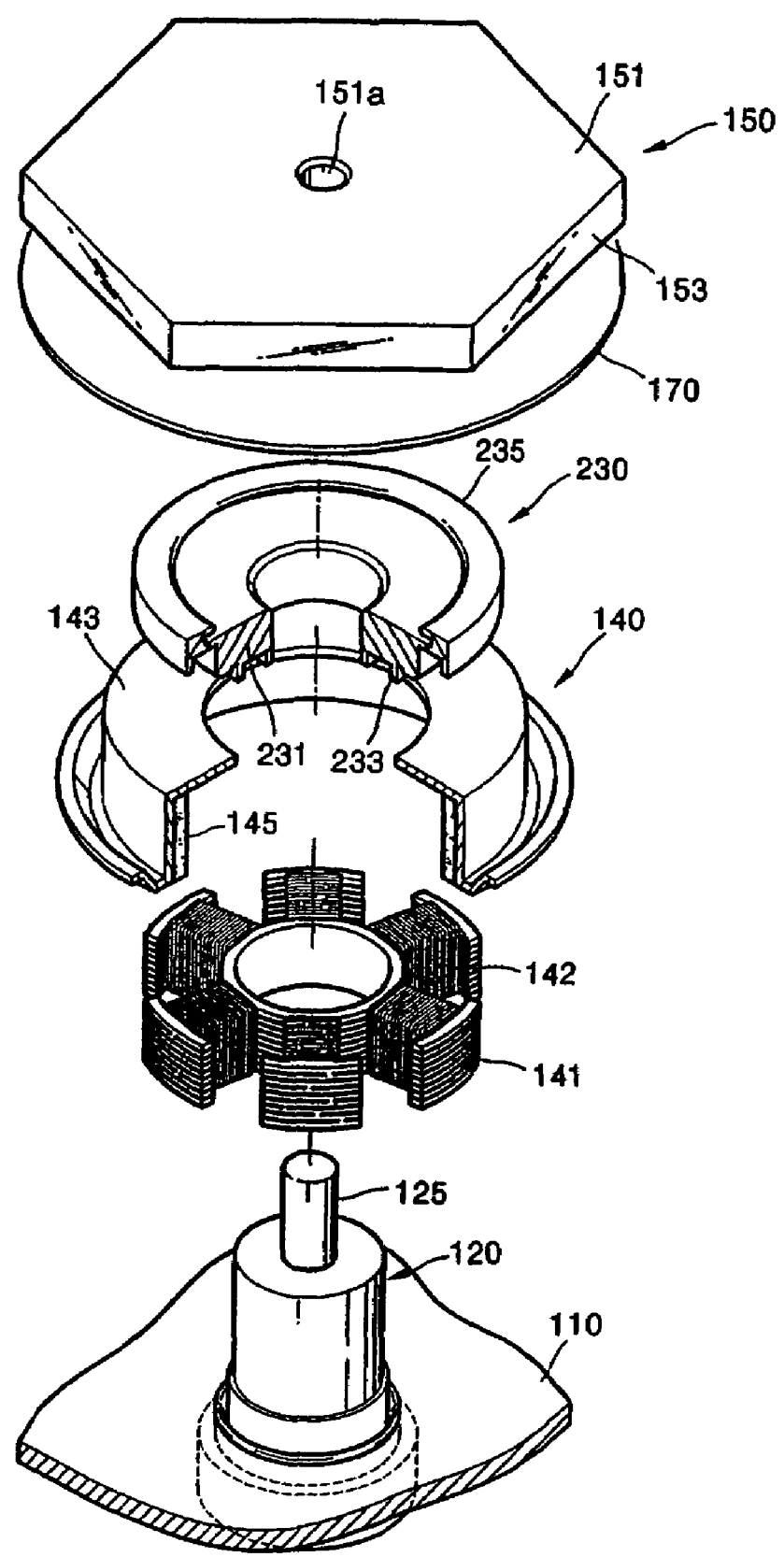
FIG. 4A is an exploded, partially cut-away perspective view of a polygonal mirror apparatus according to a third embodiment of the present invention.
Figure 4B:
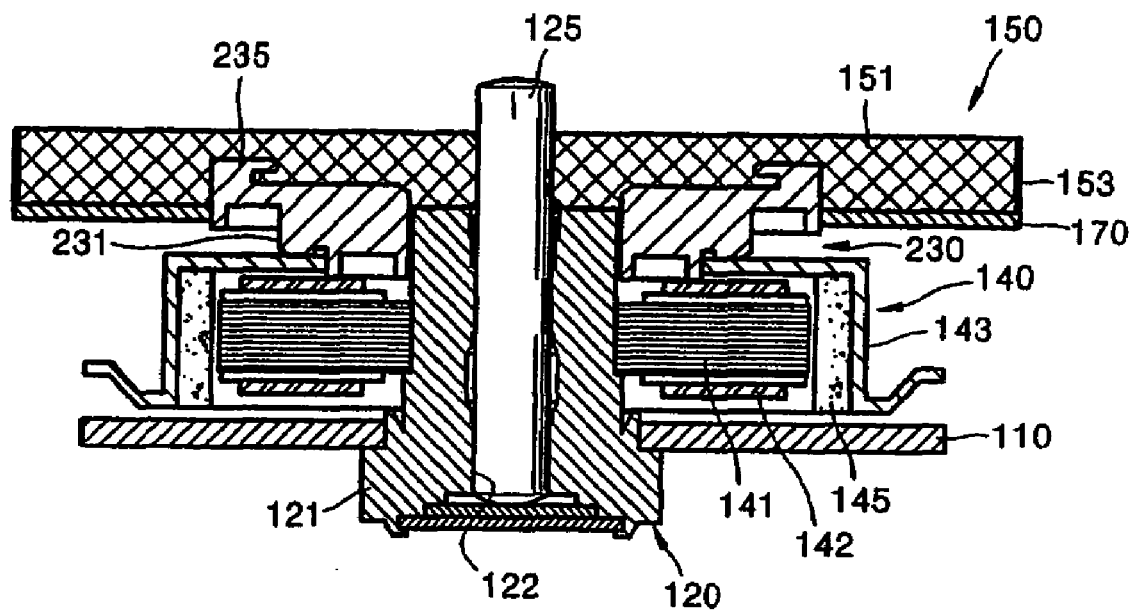
FIG. 4B is a sectional view of the polygonal mirror apparatus according to the third embodiment of the present invention.

Referring to FIGS. 4A and 4B, a polygonal mirror apparatus according to a third embodiment of the present invention is substantially similar to the first embodiment of the present invention, with the exception of further including an anti-contamination member 170 to prevent the polygonal mirror from being contaminated.

The anti-contamination member 170 is coupled to an outer circumference of a rotor frame 230 and is disposed below the polygonal mirror 150. The anti-contamination member 170 has a substantially circular plate structure that, especially when the bearing 120 is rotated by hydrodynamic pressure, substantially prevents fluid from being splashed onto the polygonal mirror 150. The rotor frame 230 is substantially the same as the rotor frame 130 in the polygonal mirror apparatus according to the first embodiment of the present invention, with the exception of a shape of an insert 235. A shape of the rotor frame 230 is not restricted to the shape illustrated in FIGS. 4A and 4B but may have any suitable shape, such as the shape of the rotor frame 130 illustrated in FIGS. 2A and 2B.

In FIGS. 4A and 4B, the anti-contamination member 170 is positioned below the polygonal mirror 150 and is coupled to the rotor frame 230, but such structure is merely exemplary. In other words, one or more anti-contamination members 170 may be disposed above and/or below the polygonal mirror 150 to more effectively prevent the polygonal mirror 150 from being contaminated.

Figure 5:
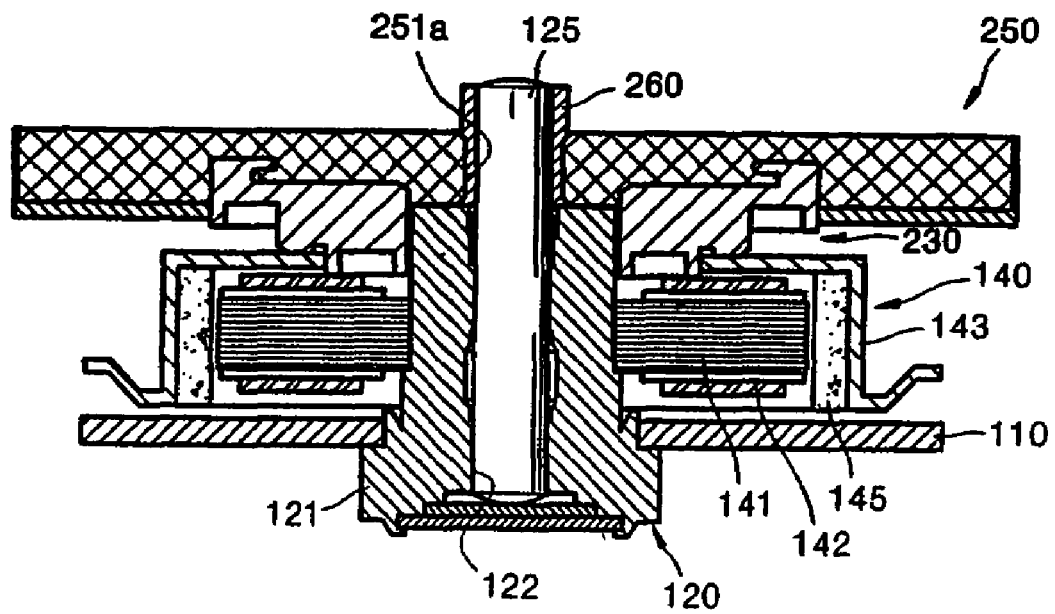
FIG. 5 is a sectional view of a polygonal mirror apparatus according to a fourth embodiment of the present invention.

Referring to FIG. 5, a polygonal mirror apparatus according to a fourth embodiment of the present invention is substantially similar to the third embodiment of the present invention, with the exception of a coupling structure between the polygonal mirror 250 and the rotating shaft 125.

The polygonal mirror 250 includes the fourth bore 251*a* and having a diameter greater than that of the rotating shaft 125. In addition, the shaft housing 260 is disposed between the fourth bore 251*a* and the rotating shaft 125. The polygonal mirror 250 with the fourth bore 251*a* and the shaft housing 260 shown in FIG. 5 have substantially similar structure and effects as those having the like numerals illustrated in FIG. 3 according to the second embodiment of the present invention.

Figure 6:
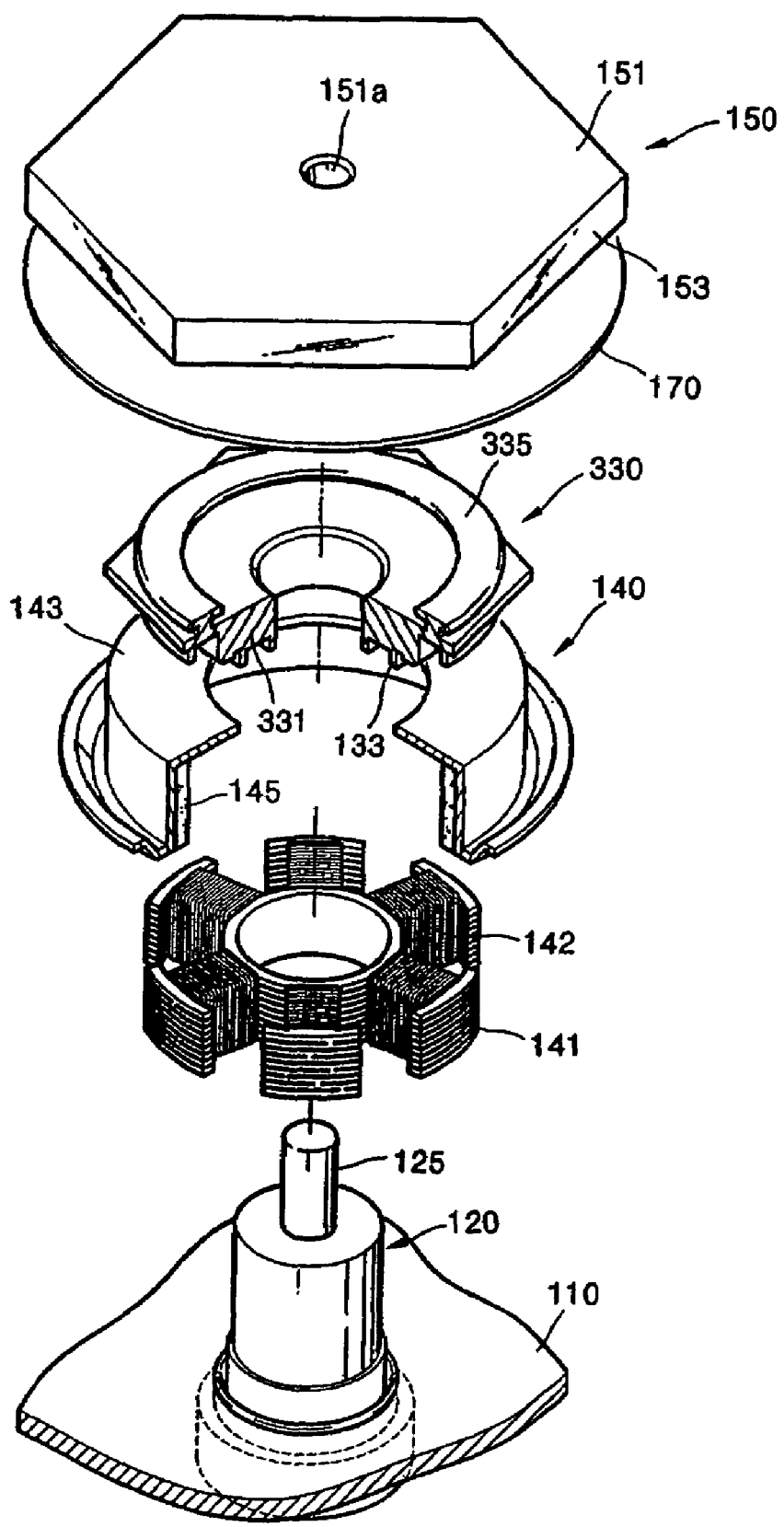
FIG. 6 is an exploded, partially cut-away perspective view of a polygonal mirror apparatus according to a fifth embodiment of the present invention.

Referring to FIG. 6, a polygonal mirror apparatus according to a fifth embodiment of the present invention is substantially similar to the first embodiment of the present invention, with the exception of a structure of a rotor frame 330 and use of the anti-contamination member 170.

Referring to FIG. 6, the rotor frame 330 connects the driving source 140 with the polygonal mirror 150 and includes a body 331 and an insert 335 protruding from the body 331. The body 331 has a polygonal shape corresponding to the shape of the polygonal mirror. The thickness of the polygonal mirror 150 molded around the rotor frame 330 is substantially the same throughout the edge of the polygonal mirror 150, the same molding conditions may be used. Accordingly, when the polygonal mirror 150 is reduced after being molded, the amount of reduction at the edge of the polygonal mirror 150 may be minimized.

Figure 7:
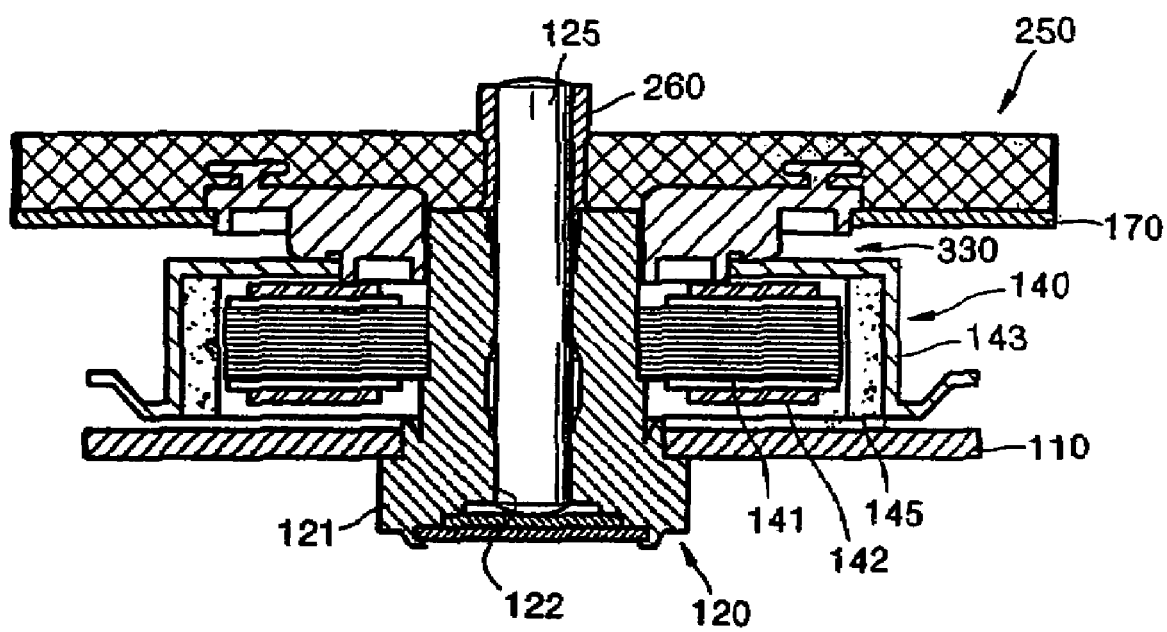
FIG. 7 is a sectional view of a polygonal mirror apparatus according to a sixth embodiment of the present invention.

Referring to FIG. 7, a polygonal mirror apparatus according to a sixth embodiment of the present invention is substantially similar to the fifth embodiment of the present invention, with the exception of a coupling structure between the polygonal mirror 250 and the rotating shaft 125. The coupling structure between the polygonal mirror 250 and the rotating shaft 125 is substantially similar to that illustrated in FIG. 3 according to the second embodiment of the present invention.

Figure 8A:
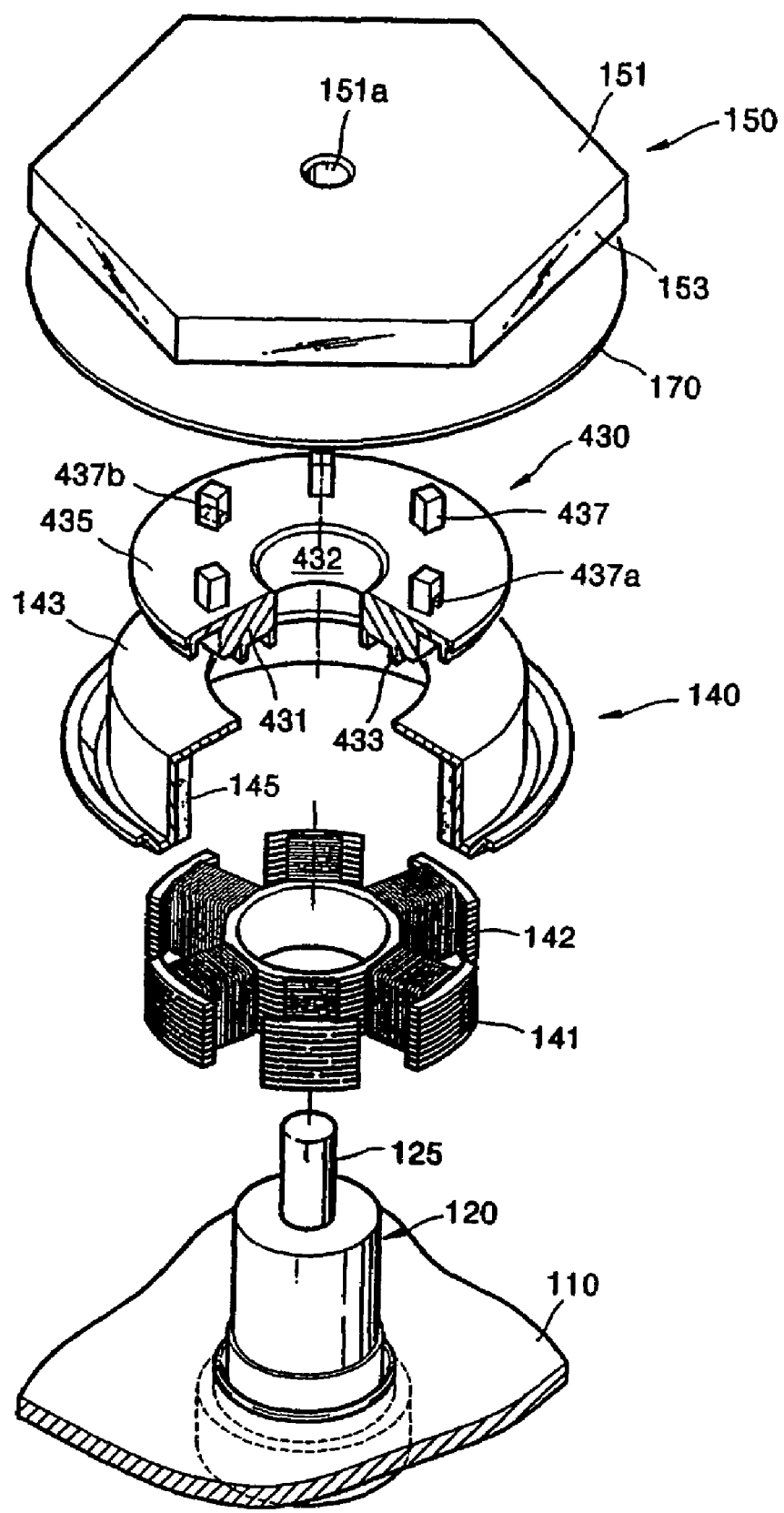
FIG. 8A is an exploded, partially cut-away perspective view of a polygonal mirror apparatus according to a seventh embodiment of the present invention.
Figure 8B:
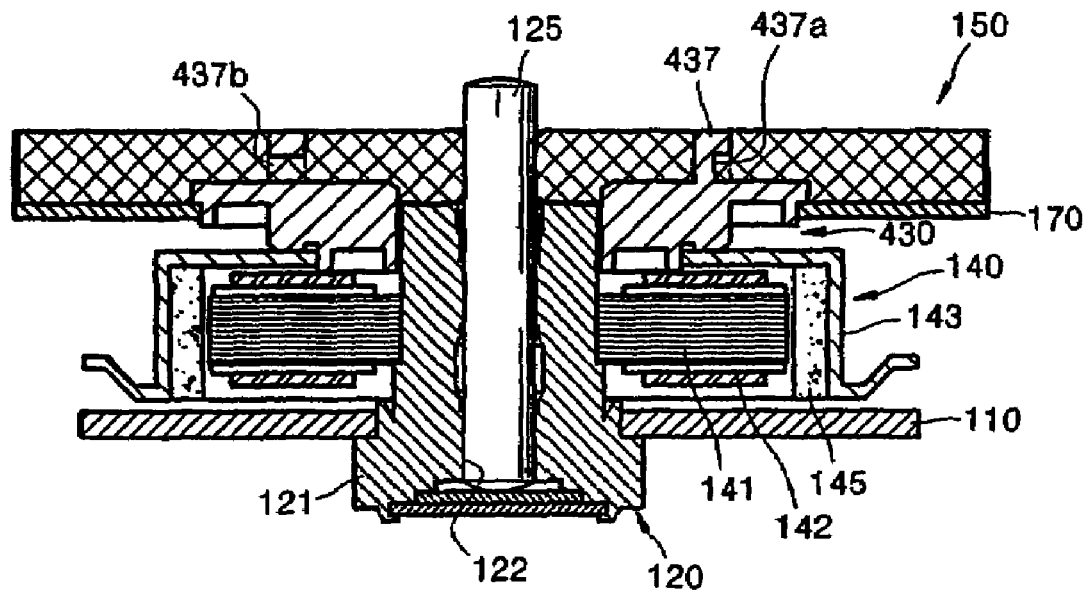
FIG. 8B is a sectional view of the polygonal mirror apparatus according to the seventh embodiment of the present invention.

Referring to FIGS. 8A and 8B, a polygonal mirror apparatus according to a seventh embodiment of the present invention is substantially similar to the third embodiment of the present invention, with the exception of a structure of a rotor frame 430.

Referring to FIGS. 8A and 8B, the rotor frame 430 connects the driving source 140 with the polygonal mirror 150 and is coupled to the polygonal mirror 150 using insert molding. The rotor frame 430 includes a body 431 with a second bore 432 and an insert 435 protruding from the body 431.

An outer shape of the body 431 is preferably circular. A part of the body 431 is inserted into the polygonal mirror 150 and the rest of the body 431 is exposed externally thereof. A coupling projection 433 coupled to the rotor housing 143 is formed on a bottom of the exposed body 131.

The insert 435 protruding from the body 431 includes a plurality of ribs 437 separated from each other by a predetermined distance. When the polygonal mirror 150 is molded with respect to the rotor frame 430 having such structure, the polygonal mirror 150 is formed around the ribs 437, thereby preventing the polygonal mirror 150 from being separated from the rotor frame 430 even during high-speed rotation.

At least one rib 437 may have a recess 437*a* or a via-hole (or through hole) 437*b*. When the recess 437*a* or the via-hole (or through hole) 437*b* is formed, part of a material of the polygonal mirror 150 is present in the recess 437*a* or the via-hole 437*b* so that the polygon mirror 150 is not separated from the rotor frame 430.

Figure 9:
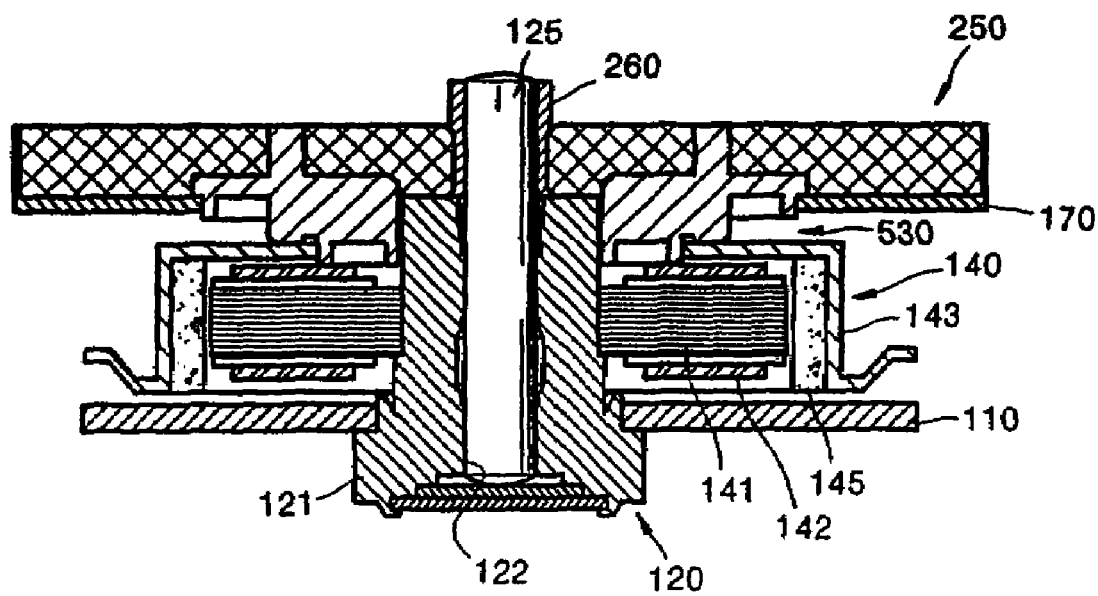
FIG. 9 is a sectional view of a polygonal mirror apparatus according to an eighth embodiment of the present invention.

Referring to FIG. 9, a polygonal mirror apparatus according to an eighth embodiment of the present invention is substantially similar to the seventh embodiment of the present invention, with the exception of a coupling structure between the polygonal mirror 250 and the rotating shaft 125. The coupling structure between the polygonal mirror 250 and the rotating shaft 125 is substantially similar to that illustrated in FIG. 3 according to the second embodiment of the present invention.

Figure 10A:
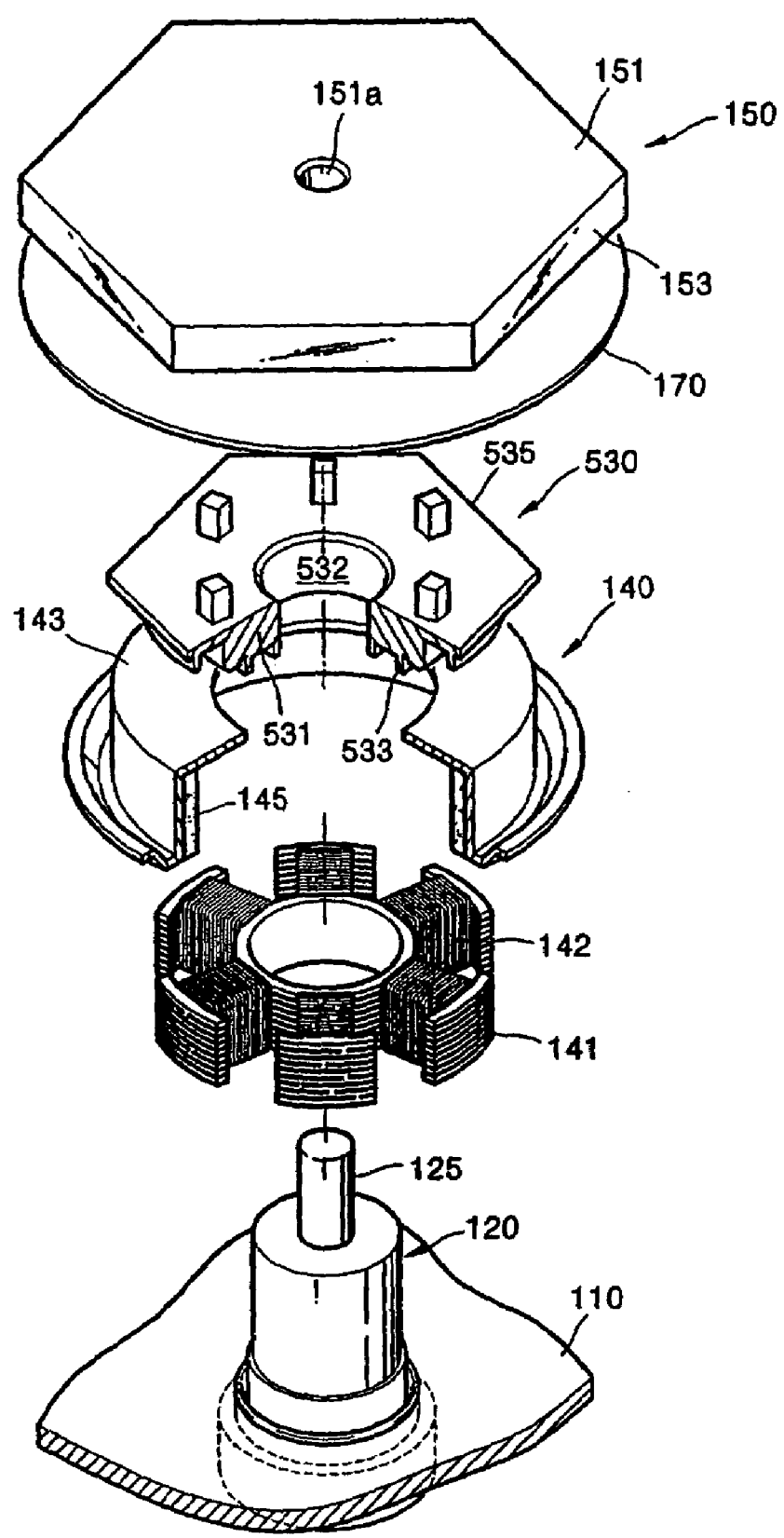
FIG. 10A is an exploded, partially cut-away perspective view of a polygonal mirror apparatus according to a ninth embodiment of the present invention.
Figure 10B:
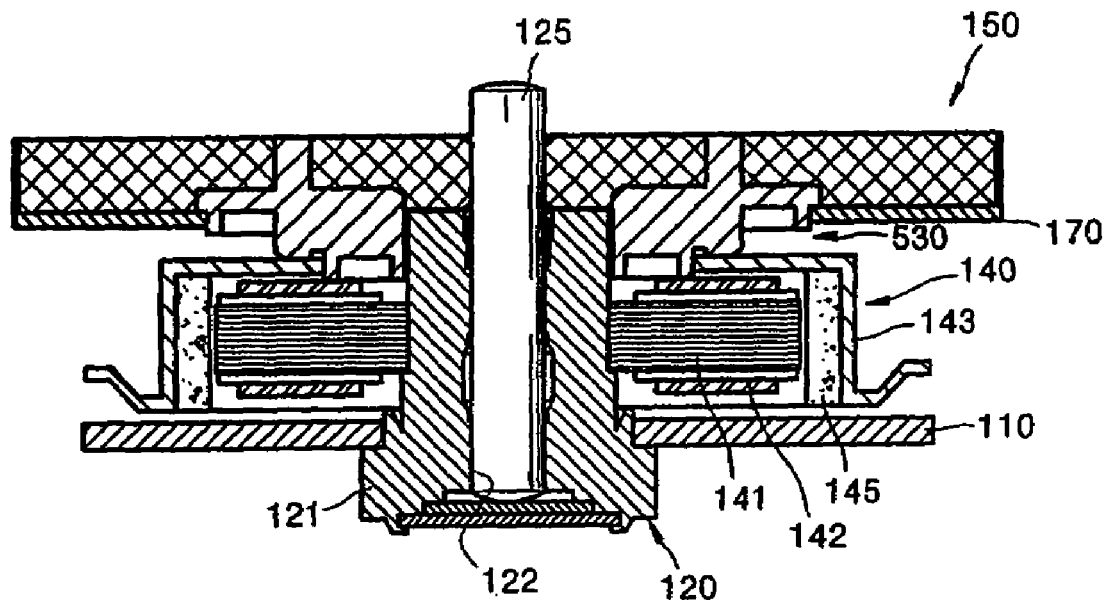
FIG. 10B is a sectional view of the polygonal mirror apparatus according to the ninth embodiment of the present invention.

Referring to FIGS. 10A and 10B, a polygonal mirror apparatus according to a ninth embodiment of the present invention is substantially similar to the seventh embodiment of the present invention, with the exception of a structure of a rotor frame 530.

The rotor frame 530 includes a body 531 and an insert 535 protruding from the body 531. Unlike the polygonal mirror apparatus according to the seventh embodiment illustrated in FIGS. 8A and 8B, an outer shape of the body 531 is a polygon corresponding to an outer shape of the polygonal mirror 150. The thickness of the polygonal mirror 150 molded around the rotor frame 530 is substantially the same throughout the edge of the polygonal mirror 150, thus the same molding conditions may be used.

Figure 11:
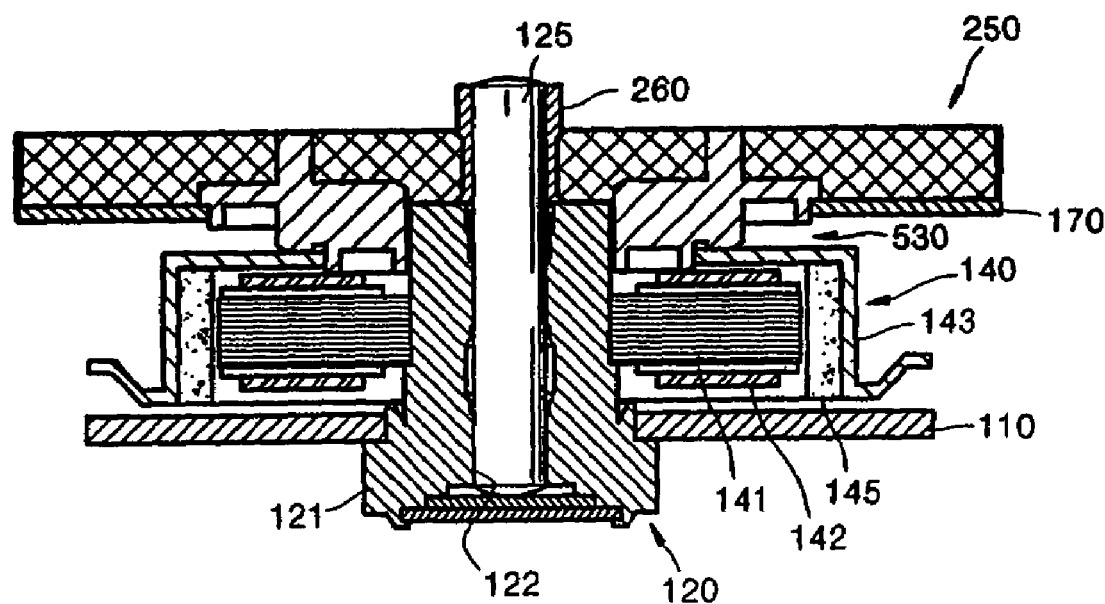
FIG. 11 is a sectional view of a polygonal mirror apparatus according to a tenth embodiment of the present invention.

Referring to FIG. 11, a polygonal mirror apparatus according to a tenth embodiment of the present invention is substantially similar to a ninth embodiment of the present invention, with the exception of a coupling structure between the polygonal mirror 250 and the rotating shaft 125. The coupling structure between the polygonal mirror 250 and the rotating shaft 125 is substantially similar to that illustrated in FIG. 3 according to the second embodiment of the present invention.

The polygonal mirror apparatus according to the tenth embodiment of the present invention has features of the polygonal mirror apparatuses according to the second and ninth embodiments of the present invention. Accordingly, molding conditions may be easily controlled when the polygonal mirror 250 is molded, and the polygonal mirror 250 may be reliably coupled with the rotating shaft 125.

Figure 12A:
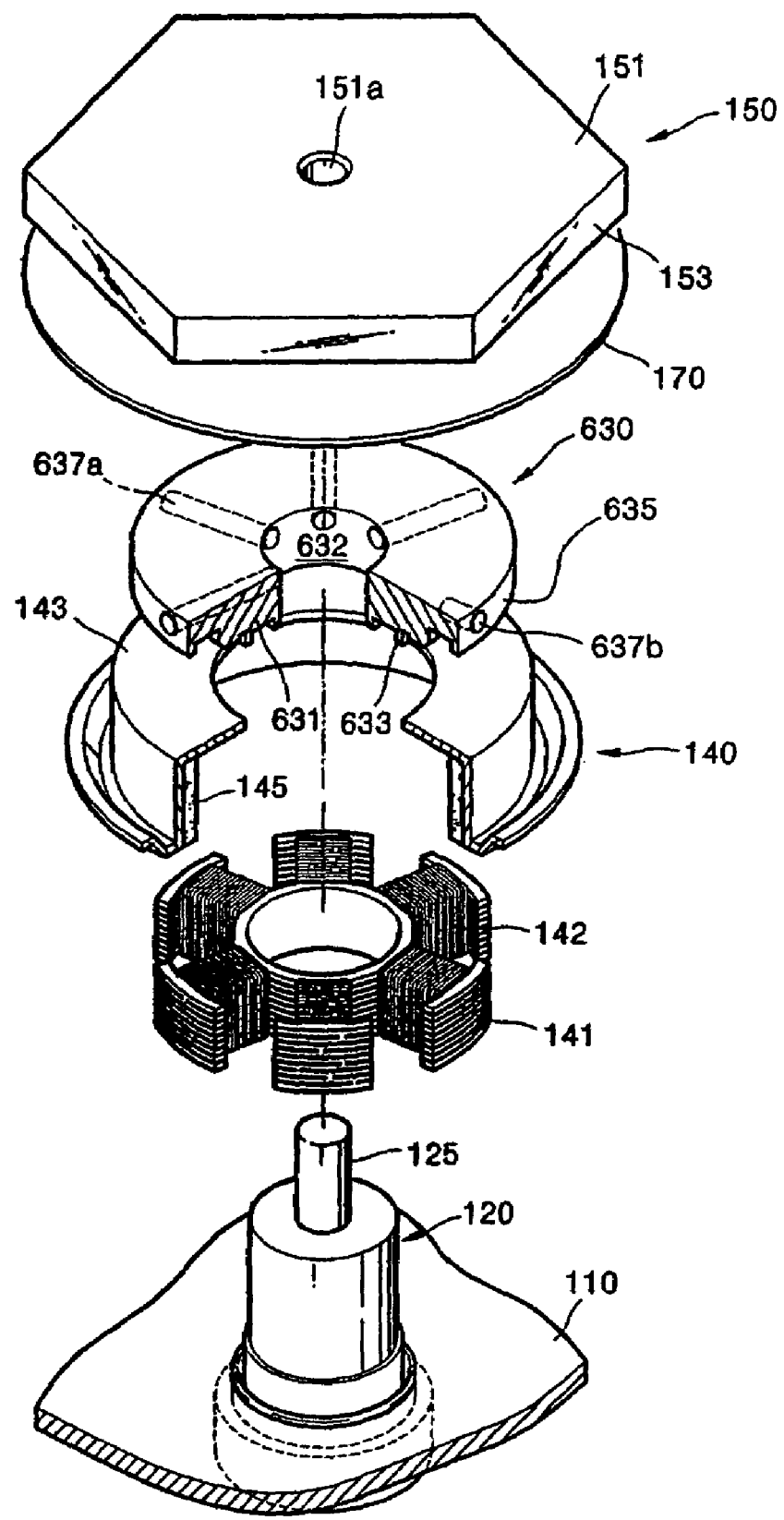
FIG. 12A is an exploded, partially cut-away perspective view of a polygonal mirror apparatus according to an eleventh embodiment of the present invention.
Figure 12B:
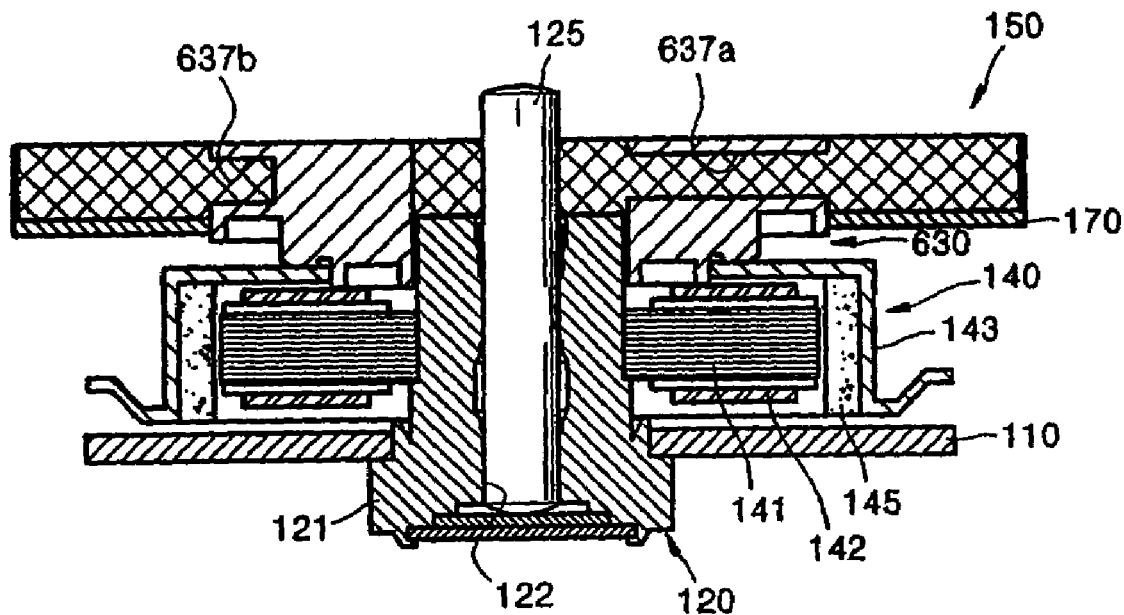
FIG. 12B is a sectional view of the polygonal mirror apparatus according to the eleventh embodiment of the present invention.

Referring to FIGS. 12A and 12B, a polygonal mirror apparatus according to an eleventh embodiment of the present invention is substantially similar to the seventh embodiment of the present invention, with the exception of a structure of a rotor frame 630.

Referring to FIGS. 12A and 12B, the rotor frame 630 connects the driving source 140 with the polygonal mirror 150 and is coupled with the polygonal mirror 150 using insert molding. The rotor frame 630 includes a body 631 with a second bore 632 and an insert 635 protruding from the body 631.

The body 631 has a substantially circular outer shape and is exposed outside. A coupling projection 633 coupled to the rotor housing 143 is formed on a bottom of the exposed body 631.

The insert 635 protruding from the body 631 has a substantially circular outer shape and includes at least one hole 637a or a via-hole 637b therewithin. In this case, when the polygonal mirror 150 is molded, part of a material of the polygonal mirror 150 is present within the hole 637a or the via-hole 637b so that the polygonal mirror 150 is not separated from the rotor frame 630.

Figure 13:
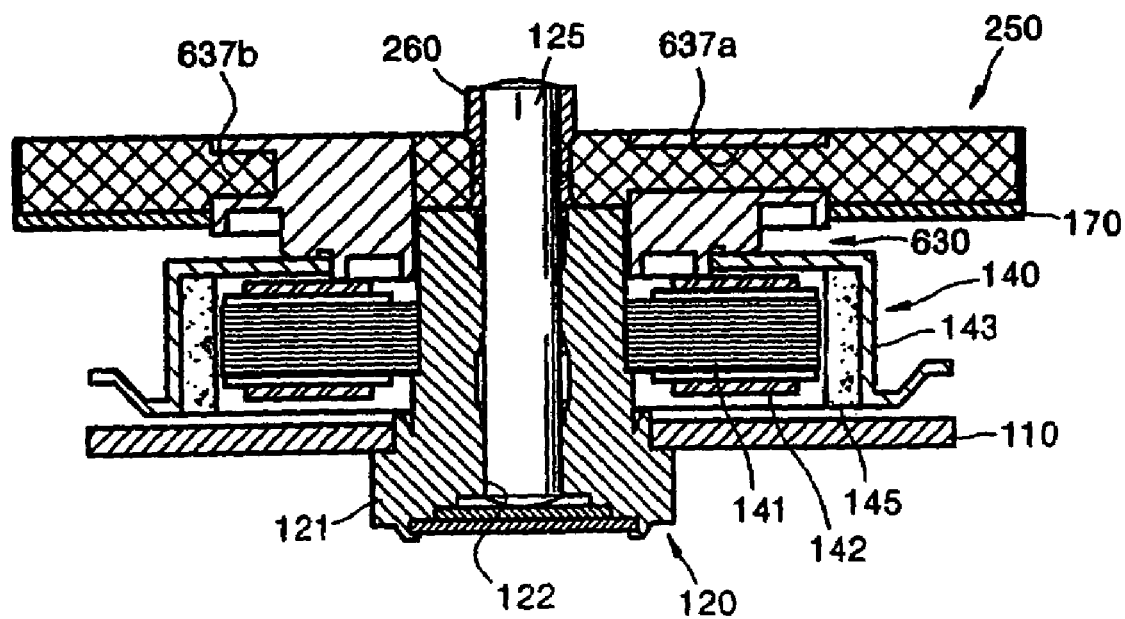
FIG. 13 is a sectional view of a polygonal mirror apparatus according to a twelfth embodiment of the present invention.

Referring to FIG. 13, a polygonal mirror apparatus according to a twelfth embodiment of the present invention is substantially similar to the eleventh embodiment of the present invention, with the exception of a coupling structure between the polygonal mirror 250 and the rotating shaft 125. The coupling structure between the polygonal mirror 250 and the rotating shaft 125 is substantially similar to that illustrated in FIG. 3 according to the second embodiment of the present invention.

Figure 14A:
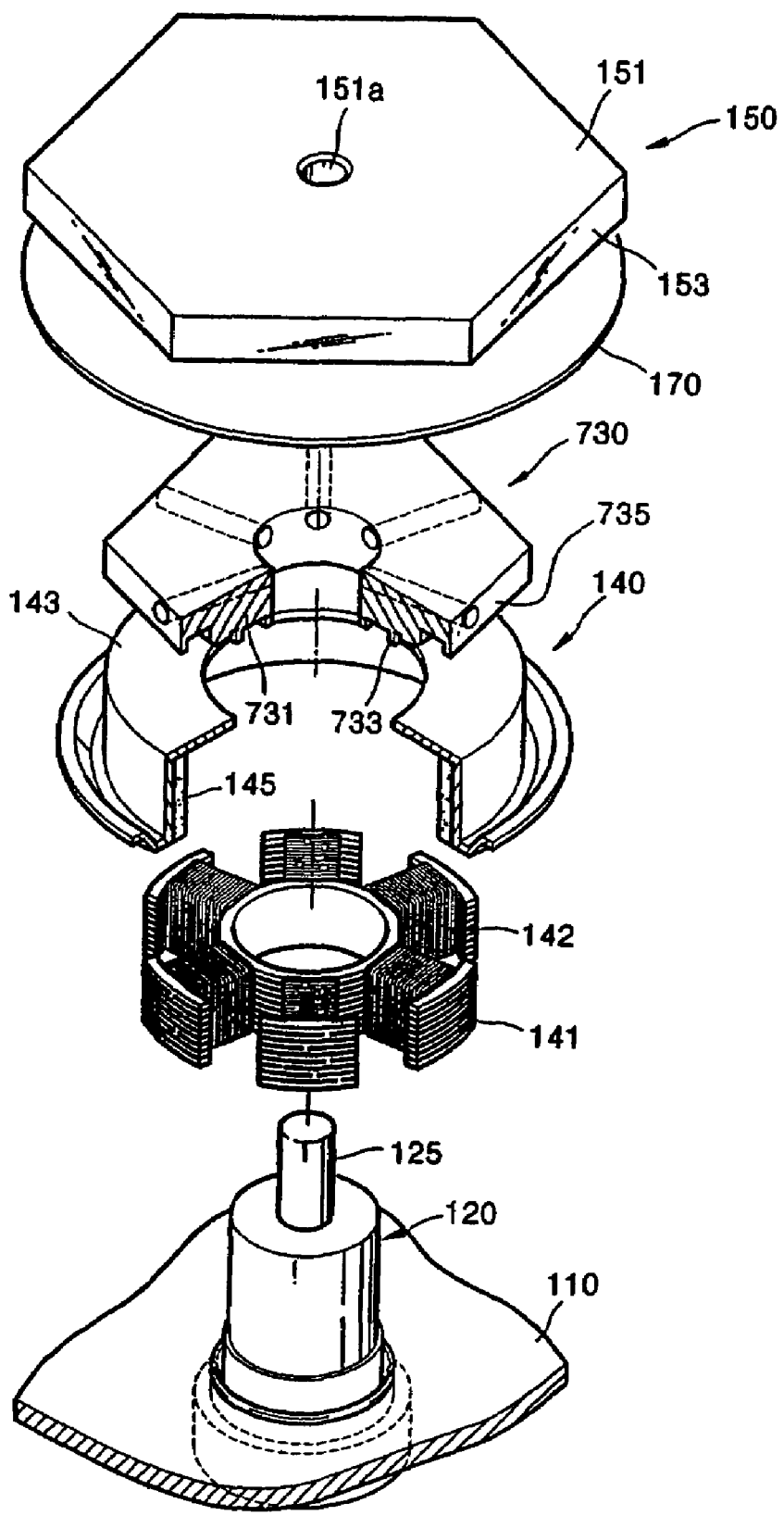
FIG. 14A is an exploded, partially cut-away perspective view of a polygonal mirror apparatus according to a thirteenth embodiment of the present invention.
Figure 14B:
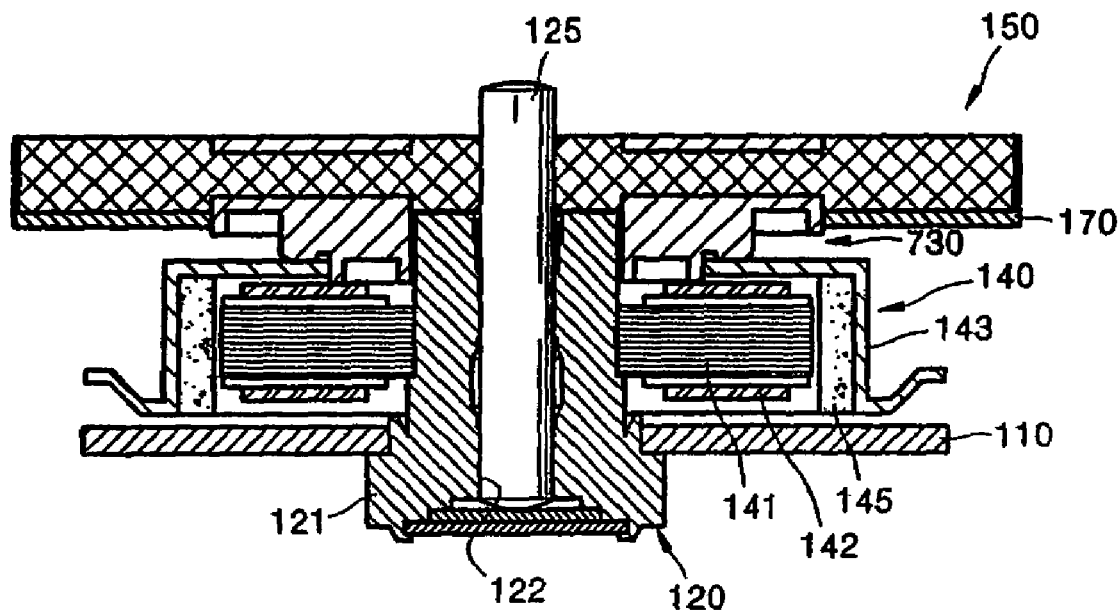
FIG. 14B is a sectional view of the polygonal mirror apparatus according to the thirteenth embodiment of the present invention.

Referring to FIGS. 14A and 14B, a polygonal mirror apparatus according to a thirteenth embodiment of the present invention is substantially similar to the eleventh embodiment of the present invention, with the exception of a structure of a rotor frame 730.

The rotor frame 730 includes a body 731 and an insert 735 protruding from the body 731. Unlike the polygonal mirror apparatus according to the eleventh embodiment illustrated in FIGS. 12A and 12B, an outer shape of the insert 735 is a polygon corresponding to an outer shape of the polygonal mirror 150. The thickness of the polygonal mirror 150 molded around the rotor frame 730 is substantially the same throughout the edge of the polygonal mirror 150, thus the same molding conditions may be used.

Figure 15:
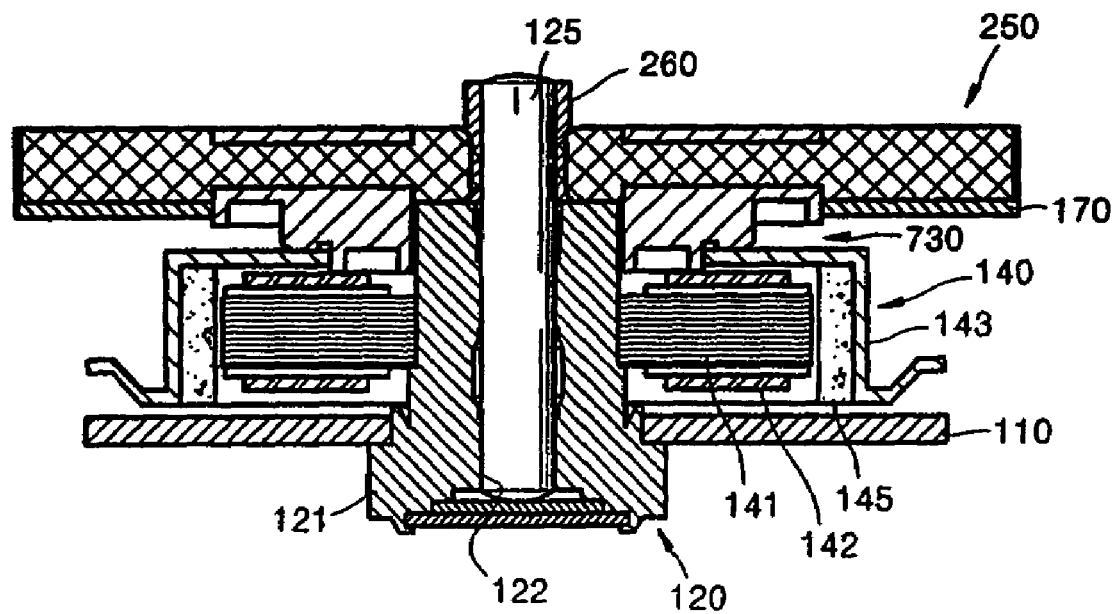
FIG. 15 is a sectional view of a polygonal mirror apparatus according to a fourteenth embodiment of the present invention.

Referring to FIG. 15, a polygonal mirror apparatus according to a fourteenth embodiment of the present invention is substantially similar to the thirteenth embodiment of the present invention, with the exception of a coupling structure between the polygonal mirror 250 and the rotating shaft 125. The coupling structure between the polygonal mirror 250 and the rotating shaft 125 is substantially similar to that illustrated in FIG. 3 according to the second embodiment of the present invention.

The polygonal mirror apparatus according to the fourteenth embodiment of the present invention has features of the polygonal mirror apparatuses according to the second and thirteenth embodiments of the present invention. Accordingly, molding conditions may be easily controlled when the polygonal mirror 250 is molded, and the polygonal mirror 250 may be reliably coupled with the rotating shaft 125.

As described above, in a polygonal mirror apparatus according to the present invention, a polygonal mirror is made using a plastic material and insert molding, thereby facilitating mass production at a lower cost than a conventional polygonal mirror made using a metallic material. In addition, a rotor frame has various structures to reliably secure the polygonal mirror thereto. Also, an anti-contamination member is used to efficiently prevent a reflecting surface of the polygonal mirror from being contaminated during rotation. Moreover, since a haft housing is used when the polygonal mirror is installed at a rotating shaft, the polygonal mirror reliably operates even during high-speed rotation.

Although the embodiments of the present invention have been shown and described, it will be understood by those skilled in the art that changes may be made in these elements without departing from the spirit and scope of the invention, the scope of which is defined in the appended claims and their equivalents.

What is claimed is:

1. A polygonal mirror apparatus, comprising:
  a base;
  a bearing coupled to the base and having a first bore;
  a rotating shaft rotatably installed in the first bore;
  a rotor frame coupled to and rotating with the rotating shaft, the rotor frame having a body having a second bore and an insert extending from the body;
  a polygonal mirror having an upper and lower surface connected to the rotating shaft and coupled to the rotor frame by insert molding such that the insert is inserted in the polygonal mirror, the polygonal mirror deflecting and scanning incident light, the polygonal mirror having a third bore extending from the upper surface to the lower surface that receives the rotating shaft; and
  a driving source disposed on the bearing and the rotor frame to rotate the polygonal mirror using electromagnetic power.

2. The polygonal mirror apparatus of claim 1, wherein the body has a substantially cylindrical shape.

3. The polygonal mirror apparatus of claim 1, wherein
  an outer shape of the body is a polygon corresponding to a shape of the polygonal mirror.

4. The polygonal mirror apparatus of claim 1, wherein
  a neck of the insert extends from the body has a substantially circular ring shape with a predetermined width; and
  a head disposed on the neck has a substantially circular ring shape with a width larger than the neck width, the insert preventing the polygonal mirror molded with respect to the rotor frame from being separated from the rotor frame.

5. The polygonal mirror apparatus of claim 1, wherein
  the insert has a plurality of ribs that protrude from the body and are separated from each other by a predetermined distance.

6. The polygonal mirror apparatus of claim 5, wherein
  at least one of the plurality of ribs has a recess, and a part of a material of the polygonal mirror is present in the recess after the polygonal mirror is molded to prevent separation of the polygonal mirror from the rotor frame.

7. The polygonal mirror apparatus of claim 5, wherein
  at least one of the plurality of ribs has a through hole penetrating the rib, and a part of a material of the polygonal mirror is present in the through hole after the polygonal mirror is molded to prevent separation of the polygonal mirror from the rotor frame.

8. The polygonal mirror apparatus of claim 1, wherein
the insert has a hole therein, and part of a material of the polygonal mirror is present in the hole after the polygonal mirror is molded to prevent separation of the polygonal mirror from the rotor frame.

9. The polygonal mirror apparatus of claim 1, wherein
the insert has a through hole penetrating the insert, and a part of a material of the polygonal mirror is present in the through hole after the polygonal mirror is molded to prevent separation of the polygonal mirror from the rotor frame.

10. The polygonal mirror apparatus of claim 1, wherein
the third bore has a diameter corresponding to a diameter of the rotating shaft, and the rotating shaft is directly inserted in the third bore.

11. The polygonal mirror apparatus of claim 1, wherein
the third bore has a diameter greater than a diameter of the rotating shaft, and a shaft housing is disposed between the third bore and the rotating shaft.

12. The polygonal mirror apparatus of claim 11, wherein
an anti-contamination member is disposed on the rotor frame to prevent the polygonal mirror from being contaminated.

13. The polygonal mirror apparatus of claim 1, wherein
an anti-contamination member is disposed on the rotor frame to prevent the polygonal mirror from being contaminated.

14. The polygonal mirror apparatus of claim 13, wherein
the anti-contamination member is disposed on an outer circumference of the rotor frame and below the polygonal mirror.

15. The polygonal mirror apparatus of claim 14, wherein
a second anti-contamination member is disposed above the polygonal mirror.

16. The polygonal mirror apparatus of claim 1, wherein
a body of the polygonal mirror is made using a plastic material;
a sidewall of the polygonal mirror body is coated with a photocurable resin to planarize the sidewall; and
a reflector is disposed on the photocurable resin.

17. The polygonal mirror apparatus of claim 16, wherein
the reflector is formed by coating the photocurable resin with either an aluminum or silver material.

18. The polygonal mirror apparatus of claim 1, wherein
a body of the polygonal mirror is made using a plastic material;
a ceramic layer is formed on a sidewall of the polygonal mirror body to enhance a strength of the sidewall; and
a reflector is formed on the ceramic layer.

19. The polygonal mirror apparatus of claim 18, wherein
the reflector is formed by coating the ceramic layer with either an aluminum or silver material.

* * * * *